United States Patent
Le Moing et al.

(10) Patent No.: US 9,303,786 B2
(45) Date of Patent: Apr. 5, 2016

(54) AUTONOMOUS VALVE CONTROL AND MONITORING

(71) Applicant: Honeywell International Inc., Morristown, NJ (US)

(72) Inventors: Christophe Le Moing, Montbonnot (FR); Andy Mark Nicol, Lanark (GB); Pascal Schweizer, Montbonnot (FR); Kenneth Allan, Lanark (GB)

(73) Assignee: Honeywell International Inc., Morris Plains, NJ (US)

( * ) Notice: Subject to any disclaimer, the term of this patent is extended or adjusted under 35 U.S.C. 154(b) by 98 days.

(21) Appl. No.: 14/159,313

(22) Filed: Jan. 20, 2014

(65) Prior Publication Data
US 2014/0305525 A1     Oct. 16, 2014

Related U.S. Application Data (60) Provisional application No. 61/812,675, filed on Apr. 16, 2013.

(51) Int. Cl.
*F16K 37/00*     (2006.01)

(52) U.S. Cl.
CPC ....... *F16K 37/0083* (2013.01); *Y10T 137/8225* (2015.04)

(58) Field of Classification Search
CPC .................. F16K 37/0083; Y10T 137/8225
USPC .............. 137/553, 554; 340/870.01; 116/277; 251/129.04
See application file for complete search history.

(56) References Cited

U.S. PATENT DOCUMENTS

| 4,274,438 | A | * | 6/1981 | La Coste | ........................ 137/551 |
| 4,879,901 | A | * | 11/1989 | Leon | ............................... 73/168 |
| 4,976,144 | A | * | 12/1990 | Fitzgerald | ....................... 73/168 |

(Continued)

FOREIGN PATENT DOCUMENTS

| DE | 19723650 A1 | 12/1998 |
| DE | 20008930 U1 | 7/2001 |

(Continued)

OTHER PUBLICATIONS

European Examination Report, Application No. 14163629.0-1751, Received Jul. 29, 2014, 7 pages.

(Continued)

*Primary Examiner* — Marina Tietjen
*Assistant Examiner* — Umashankar Venkatesan
(74) *Attorney, Agent, or Firm* — Conley Rose, P.C.; Kristin Jordan Harkins (57) ABSTRACT

Apparatus and associated methods relate to an autonomous controllable valve system for providing turbulent flow to a cleaning solution during a valve-cleaning operation, the valve system includes a valve and a valve controller, the valve has an MR sensor array arranged to receive a magnetic field from a magnet coupled to the valve stem, the MR sensor array generating signals indicative of a valve stem position, the valve controller receiving the position signals and generating a control signal for a valve actuator to move the valve stem to a cleaning position between a closed position and a maximal-open position. The cleaning position may be less than twenty percent of a distance between the closed position and the maximal open position. In an illustrative embodiment, the cleaning position may be predetermined to cause a turbulent flow of the cleaning solution.

20 Claims, 8 Drawing Sheets

(56) References Cited

U.S. PATENT DOCUMENTS

| | | | |
|---|---|---|---|
| 5,055,781 A * | 10/1991 | Sakakibara et al. | 324/207.21 |
| 5,329,956 A * | 7/1994 | Marriott et al. | 137/15.01 |
| 5,589,769 A | 12/1996 | Krahn | |
| 5,748,469 A | 5/1998 | Pyotsia | |
| 6,097,183 A * | 8/2000 | Goetz et al. | 324/207.12 |
| 6,674,280 B1 | 1/2004 | Goetz et al. | |
| 7,472,884 B2 * | 1/2009 | Nishida et al. | 251/129.2 |
| 7,694,936 B2 * | 4/2010 | Hoffmann et al. | 251/129.04 |
| 8,443,821 B2 * | 5/2013 | Meier et al. | 137/1 |
| 2002/0092997 A1 * | 7/2002 | Parsons et al. | 251/129.04 |
| 2003/0019297 A1 * | 1/2003 | Fiebelkorn et al. | 73/587 |
| 2004/0154466 A1 * | 8/2004 | Gethmann et al. | 92/5 R |
| 2004/0211928 A1 * | 10/2004 | Coura et al. | 251/129.04 |
| 2010/0179697 A1 * | 7/2010 | Stelter et al. | 700/282 |
| 2013/0041481 A1 | 2/2013 | Seberger | |

FOREIGN PATENT DOCUMENTS

| | | |
|---|---|---|
| DE | 102007050086 A1 | 4/2009 |
| WO | WO-99/53266 A1 | 10/1999 |
| WO | WO-01/75344 A1 | 10/2001 |

OTHER PUBLICATIONS

Honeywell, "Electronic Sensors and Electrocmechanical Switches in Valves and Flow Meters," Industrial Applications—Application Note, Oct. 2010, 8 pages, Golden Valley, MN.

Honeywell, "Non-Contact Magnetic Sensing," Powerpoint Presentation, 2005, 28 pages, US.

Alfa Laval, "Unique Mixproof Valve—The most advanced mixproof valve in the sanitary process industry," http://www.youtube.com/watch?v=RTUsrnUBzqs, Oct. 26, 2012.

\* cited by examiner

AUTONOMOUS VALVE CONTROL AND MONITORING

CROSS-REFERENCE TO RELATED APPLICATIONS

This application claims priority to the following U.S. patent application(s), the entire disclosure of each of which is incorporated herein by reference: 61/812,675 Autonomous Valve Control and Monitoring Apr. 16, 2013

TECHNICAL FIELD

Various embodiments relate generally to a valve controller, and more specifically to a valve controller that uses an MR sensor array for measuring valve position, calculating valve-stem speed, and optimizing valve control parameters.

BACKGROUND

Various industries rely on valves to control the flow of gaseous or liquid materials. Some valve configurations may be employed to perform the required industrial operations. Some valves are multi-port and others have only two ports. Some industries require valves that may be sterilized while others may require abrasion resistance or chemical resistance. Various industrial processes require valves to be cleanable in-situ so as to minimize the down-time of a valved process line. Valves may be cleaned by flowing a cleaning solution through the valve. In some situations, the valve is actuated during cleaning in a manner that improves the cleaning efficiency.

Some valves have a dedicated seat lift actuator that may operate to move the valve between a closed position and a seat-lift position at a defined location between the closed and fully-open positions. This seat lift actuator, which may be a solenoid, for example, may facilitate cleaning by promoting turbulent flow of a cleaning solution. The seat-lift position may be a position that is "nearly" closed, but permits the cleaning solution to flow through a narrow gap between a valve seat and a valve disc. Turbulent flow may result from the narrow gap orifice. This narrow gap orifice may also minimize the amount of cleaning solution required for a thorough valve cleaning operation.

SUMMARY

Apparatus and associated methods relate to an autonomous controllable valve system for providing turbulent flow to a cleaning solution during a valve-cleaning operation, the valve system includes a valve and a valve controller, the valve has an MR sensor array arranged to receive a magnetic field from a magnet coupled to the valve stem, the MR sensor array generating signals indicative of a valve stem position, the valve controller receiving the position signals and generating a control signal for a valve actuator to move the valve stem to a cleaning position between a closed position and a maximal-open position. The cleaning position may be less than twenty percent of a distance between the closed position and the maximal open position. In an illustrative embodiment, the cleaning position may be predetermined to cause a turbulent flow of the cleaning solution.

In an exemplary aspect, a valve-stem position sensor generates a signal representative of a valve-stem position along a travel path between a first extreme position and a second extreme position. The valve-stem position sensor includes a magnet coupled to a valve stem and at least two magnetic-field sensors arranged to sense the position of the magnet along the travel path. The magnet has a circumferential span of less than 180 degrees around the valve stem. The valve stem has a rotational control member that orients the valve stem to a predetermined rotational position associated with each longitudinal position along the travel path. A series of valve-stem position signals may be used to determine the speed and position of the valve stem. These signals may be used to determine the valve model, calibrate the valve, clean the valve, determine maintenance needs, or for use in closed-loop valve motion trajectory-control operations.

Various embodiments may achieve one or more advantages. For example, some embodiments may provide precise valve stem position control. For example, better metering of a fluid or chemical may result from precise control of valve stem positioning. The valve stem speed may be determined from the difference of two measurements of the valve stem position taken close in time. Such valve stem speed may facilitate the control of transient valve behavior during opening and closing operations, for example. In some embodiments, the valve may be operated more gently by slowing the valve stem speed as the valve stem approaches a target operating position. In some embodiments, the closed loop operation of the valve stem may provide for minimum cycle time operation between two valve stem positions. In some embodiments, the lifespan of a valve may be increased by preventing hammering or vibration of the valve stem when reaching fixed or hard end-point positions.

In an exemplary embodiment, a valve may be calibrated using the valve stem position as feedback to a stem control exercise. For example, the valve stem may be sequentially positioned to a certain number of set-point positions. The valve stem positions that resulted from the set-point positions may be measured. The measured positions may then be compared with a list of exemplary models values corresponding to a variety of valve models. The model may be determined from a best fit of the measured positions to the exemplary model values. In some embodiments, the measured valve stem positions may be used to determine operating parameters for the valve. For example, the best operating stimuli for transitioning the valve stem between pairs of positions may be calculated from the valve stem measurement positions.

In some embodiments, valve cleaning may be optimally performed using precise valve-stem measurement data. The precise valve stem position measurement may permit a precise cleaning seat-lift position. This precise seat-lift position may optimize the turbulent flow of a cleaning chemical, for example. In some exemplary embodiments, the amount of cleaning chemical used during a cleaning operation may be minimized by the precise control of the valve stem during a cleaning operation.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, some advantages of an exemplary self-diagnosing valve are briefly introduced with reference to FIG. 1. Second, with reference to FIGS. 2A-4 the discussion turns to exemplary embodiments that illustrate an exemplary valve-stem position measurement system. Such a valve-stem position measurement system may be used for valve identification, valve calibration, valve run-time operation, and valve condition monitoring. Finally, with reference to FIGS. 5-7, further discussion is related to exemplary methods of using a valve position measurement system.

Figure 1:
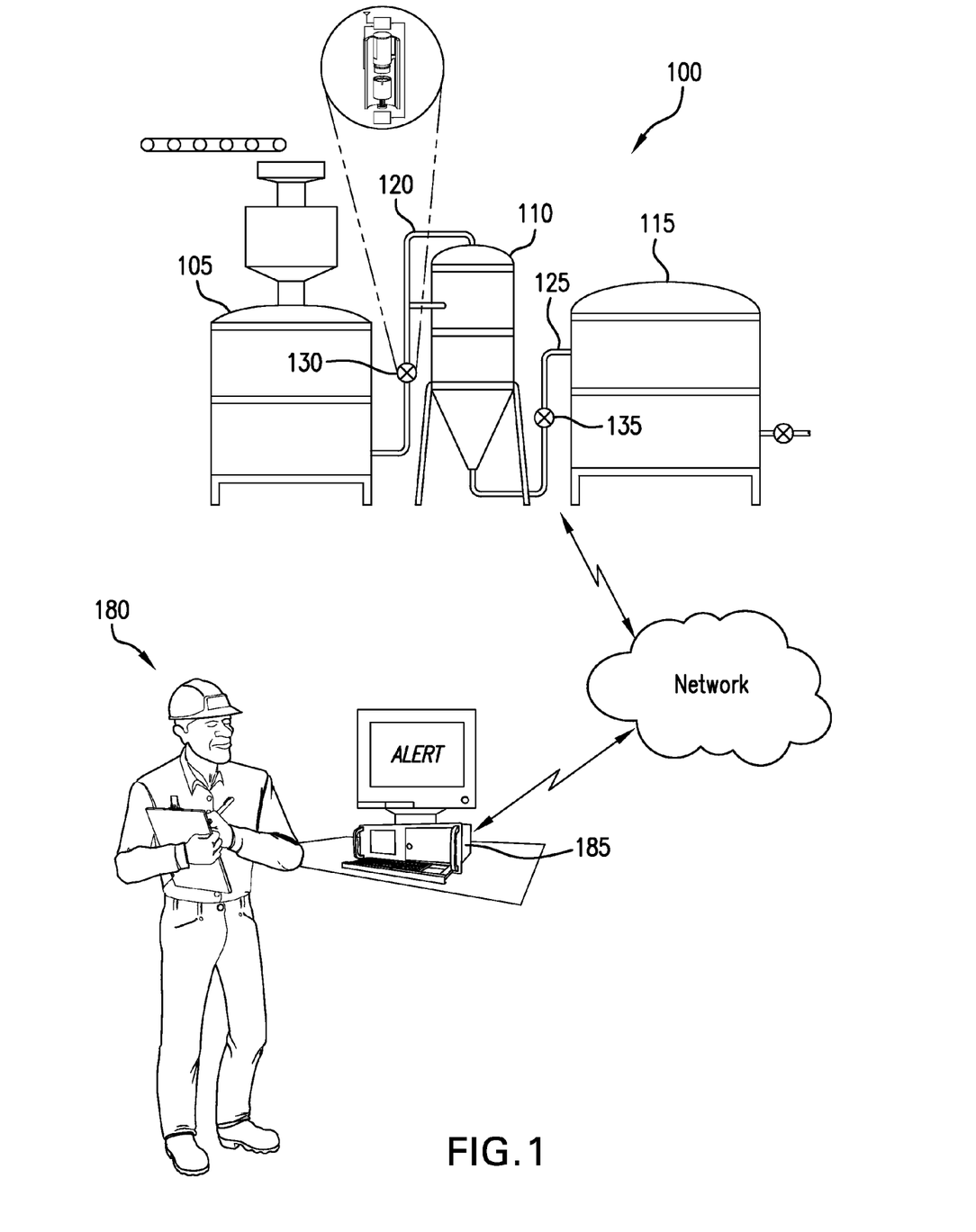
FIG. 1 depicts a scenario in which an exemplary performance monitoring valve signals a need for maintenance.

FIG. 1 depicts a scenario in which an exemplary performance monitoring valve signals a need for maintenance. In this figure, a brewery 100 is depicted with various beer processing equipment. The figure depicts various processing tanks 105, 110, 115 connected to each other via transport pipes 120, 125. The transport pipes 120, 125 are shown having valve systems 130, 135 which may control the flow of the contents from one processing tank 105, 110 to another processing tank 110, 115 by opening or closing a valve 130, 135. With reference to the valve 130 in FIG. 4, the valve 130 may be controlled by a valve control module 145. The valve 130 may have self-diagnosed a need for maintenance so that the beer processing operation can continue to proceed optimally. The valve 130 may have diagnosed a wear problem, for example. Or perhaps low pneumatic pressure has been detected by the valve 130. The valve 130 may have generated a signal to alert an employee 180 of such a maintenance need. The valve 130 may transmit the signal wirelessly to a computer 185 via an antenna 165. The employee 180, being made aware of the valve's reported alert, may respond in a manner appropriate to address the exigency.

Figure 4:
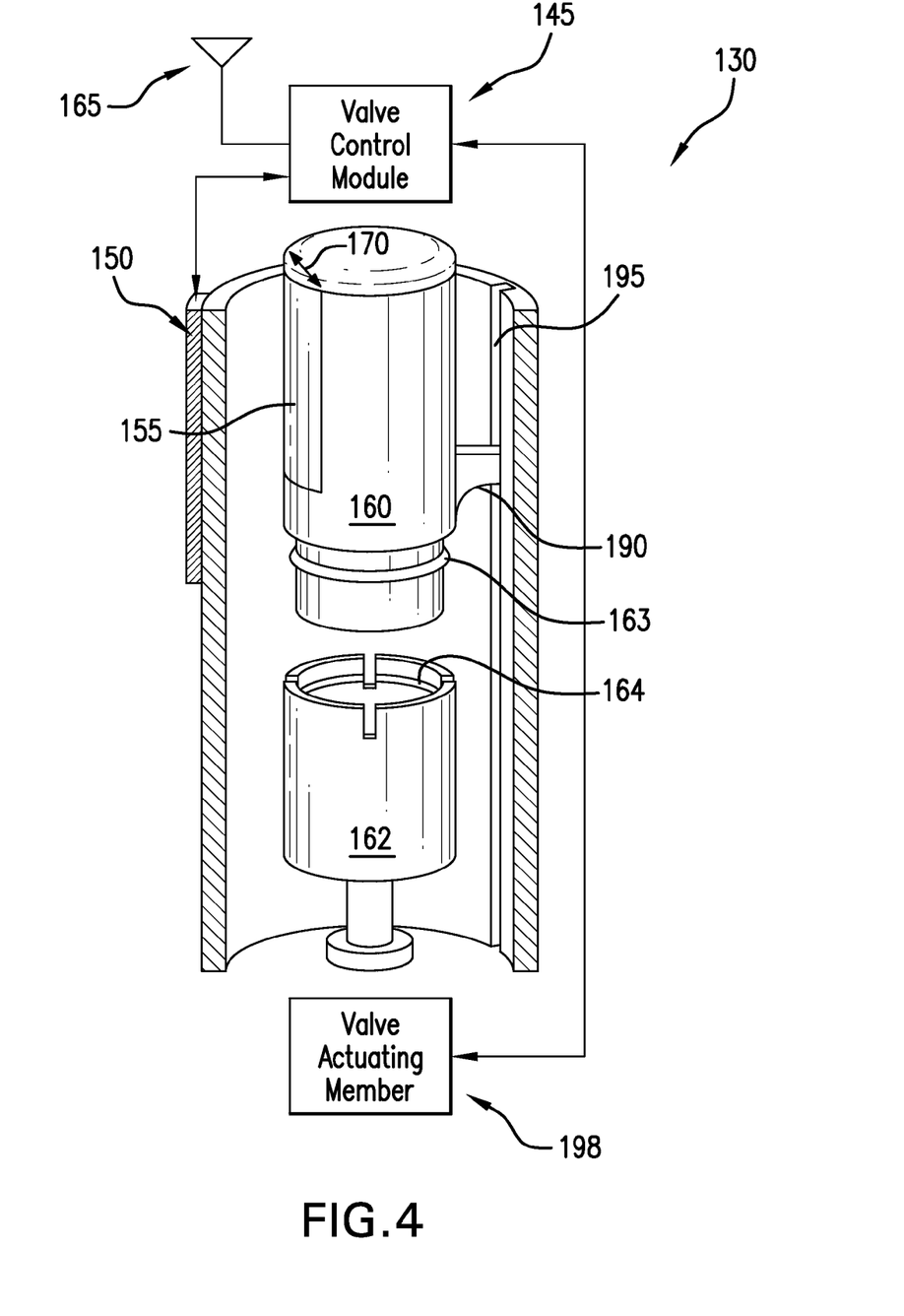
FIG. 4 depicts an exemplary valve position sensor with a rotational index member.

With reference to FIG. 4, the valve system 130 may use a valve stem position system, for example, to self-diagnose its own maintenance condition. The valve stem position system includes a magnetic-field sensor array 150. A magnet 155 coupled to a valve stem 160 may be in magnetic-field communication with the magnetic-field sensor array 150. The valve stem 160 is rotatably coupled to a valve stem base 162. The valve stem 160 and base 162 are rotatably coupled, in this depicted example, by a ring member 163 on the stem 160. In operation, the ring member 163 is slidably disposed in a circumferential groove 164 in the base 162. This arrangement allows the orientation of the valve stem 160 to be decoupled from the orientation of the base 162. In some embodiments, this ring/groove decoupling mechanism may be supplemented or replaced with a ball bearing mechanism that provides longitudinally rigid coupling and low friction rotational coupling between the stem 160 and the base 162.

In operation, the valve control module 145 may receive signals indicative of a position of the valve stem 160 from the magnetic-field sensor array 150. The depicted magnet 155 is shown having a circumferential span 170 of less than 180 degrees. Maintaining an angular orientation of the magnet 155 with respect to the magnetic-field sensor array 150 may maintain magnetic field communication and alignment between a field of the magnet 155 and the magnetic-field sensor array 150. An angular control member or index 190, may provide angular alignment of the magnet 155 to the magnetic-field sensor array 150, for example. In the depicted embodiment, the angular control member or index 190 is slidably coupled to a longitudinal index slot 195. The orientation of the magnet may be dictated by the index 190 and the slot 195. With respect to the longitudinal axis, the orientation of the magnet 155 may be substantially independent of the orientation of the valve base 162 by virtue of the freely rotatable coupling provided by the decoupling mechanism, which in this example is depicted as the ring 163 and the slot 164.

Figure 2A:
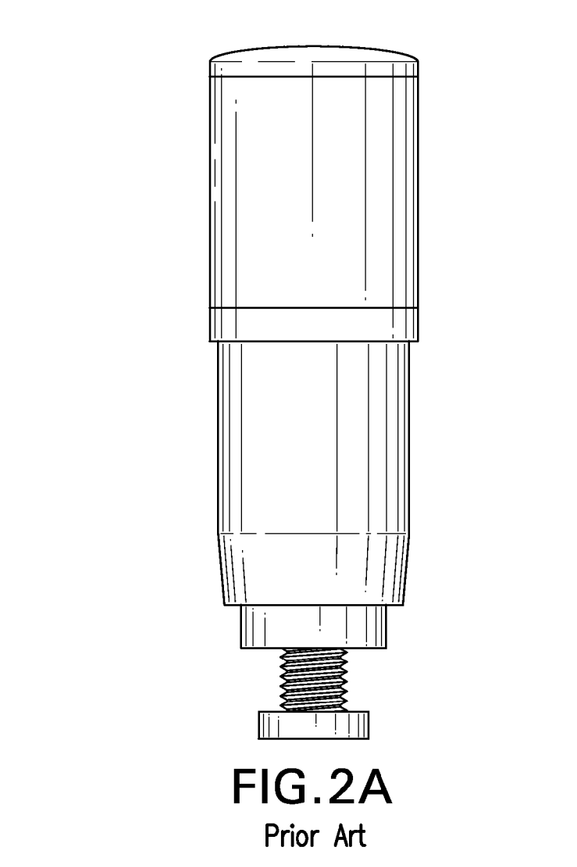
FIG. 2A depicts an existing magnet assembly used in industry today.

FIG. 2A depicts an existing magnet assembly used in industry today. The magnet it carries is a closed ring shape that extends a full 360 degrees around the valve stem.

Figure 2B:
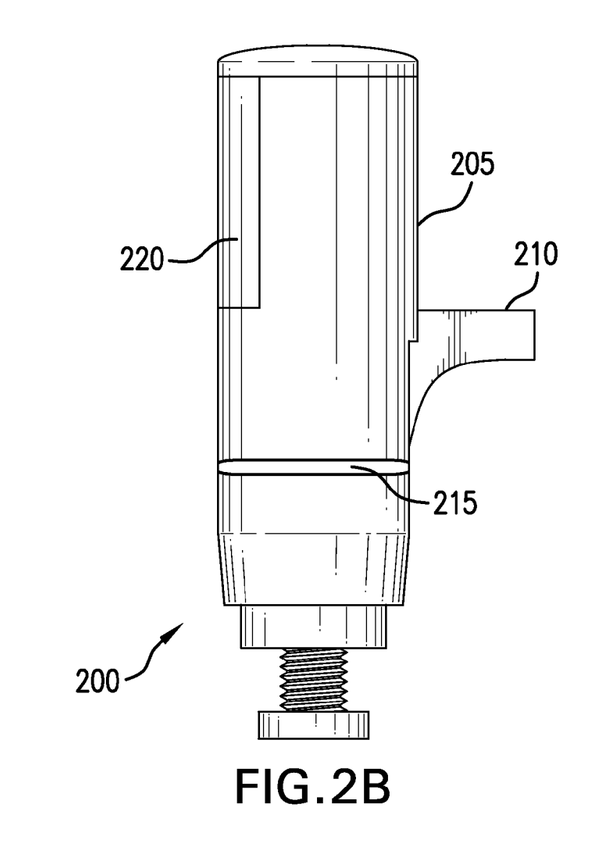
FIG. 2B depicts an exemplary magnet assembly with reduced-size magnet requirements.

FIG. 2B depicts an exemplary magnet carrier with reduced-size magnet requirements. In the embodiment of FIG. 2B, the magnet need not be designed to present a substantially uniform field pattern around the entire circumference as the valve stem rotates with respect to the sensor array during operation. This simplification of the magnetic field uniformity requirements may substantially reduce complexity and cost in the design of the magnetic target and sensing device. According to one embodiment, the valve design may include a stem 200, a magnet carrier 205 with index 210, a mechanical decoupling mechanism 215 to decouple rotational motion of the stem 200 from the magnet carrier 205 during the linear stoke of the valve, at least one magnet 220, a set of magneto-resistive components (not depicted) defining a detection zone of this magnet, and an index cavity (not depicted) within the sensor housing. In one embodiment, the magnet carrier 205 is coupled on the valve stem 200, the magnet carrier index 210 may be slidably coupled within the index cavity of the sensor housing, independent of stem rotations by virtue of the decoupling mechanism 215 resulting from the rotational motion.

Figure 3A:
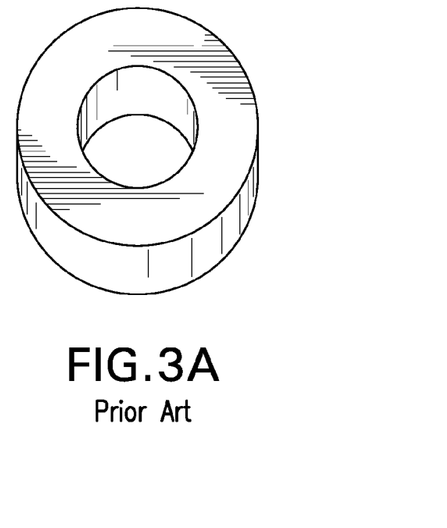
FIGS. 3A-3B depict prior art magnets used for valve stem position detection.
Figures 3B, 3D:
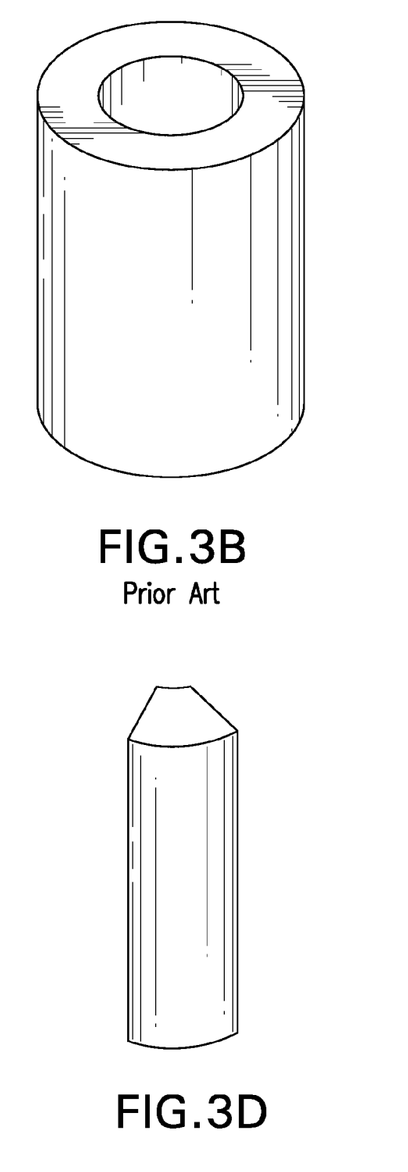
FIGS. 3C-3D depict exemplary magnets used for valve stem position detection.

FIGS. 3A-3B depict prior art magnets used for valve stem position detection. These magnets form closed loop rings that generate a field pattern around a full 360 degrees with respect to the longitudinal axis. Prior art valve stem magnets are depicted in FIGS. 3A-3B. In both figures, circumferential magnets may require magnetic uniformity around the full 360 degree circumference.

Figure 3C:
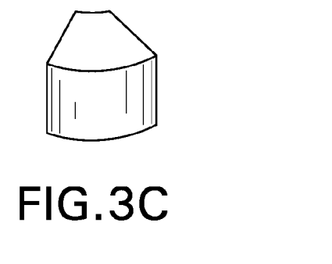

FIGS. 3C-3D depict exemplary magnets used for valve stem position detection. In various valve embodiments described herein, the decoupling mechanism removes unwanted rotational movement of the magnet. As the spatial relationship between the magnet and the sensor array is substantially fixed at all points along the longitudinal axis, the magnetic coupling may be highly repeatable with regard to field strength and direction. In some embodiments, it may be easier to obtain magnetic uniformity for a small magnet better than for a large magnet. Furthermore, small magnets may be lower in cost than large ones. The magnet depicted in FIG. 3C may be made at a low cost and with a high degree of magnetic uniformity. Problems from part to part variations of such a magnet may be significantly reduced due to the reduction of complexity (e.g., simplified size and shape of the magnet). Increased uniformity of the magnet reduces sensor design complexity.

Although the exemplary magnet depicted in FIG. 3C-3D have a characteristic wedge shape, other shapes are possible. The magnet's size and shape may be optimized to the linear movement that matches a determined motion profile or within the detection field provided by the set of magneto-resistive components.

FIG. 4 depicts an exemplary valve position sensor with a rotational index member. In the depicted embodiment, a valve system 130 includes a valve control module 145 for continuously monitoring a displacement position of a valve stem 160. In many valve applications, valve control is limited to a certain number of fixed positions (e.g., energize, de-energize, seat-lift position). These fixed valve positions can be set and remain so during the process with no monitoring of the motion of the stem during transient phases. This type of control may have an impact on valve lifespan, cost of ownership of the valve and efficiency of the different processes for which the valve is used to serve.

The valve system 130 further includes a detection system 150, one or more magnetic targets 155 placed on the valve stem 160, and a valve-actuating member 198. The detection system 150 may continuously sense the displacement of the valve stem 160 within a displacement profile along which the valve stem 160 moves. A processing unit, depicted here as the valve control module 145, is able to continuously calculate a speed and a position of the valve stem 160 from data provided by the detection system 150.

The valve control module 145 is operatively coupled to drive the valve-actuating member 198 in order to continuously control a direction and a speed of the valve stem 160. The control module 145 may calculate speed and position of the valve stem 160 from data provided by the detection system 150. To generate control signals for transmission to the valve-actuating member 198, the control module 145 may continuously monitor the direction and speed of the valve stem 160. Such closed-loop control of the valve stem 160 may be used to optimize the management of the movements of the valve's internal components in order to optimize valve lifespan and/or reduce maintenance. Improvement examples include, but are not necessarily limited to, reducing or stopping the hammering effect, reducing the level of vibrations generated, and/or reducing aging effect on all seals. These may be achieved by operation of valve control and monitoring to smoothly displace a valve stem 160 to target fixed positions.

The ability of the processing unit 145 to calculate speed and position of the valve stem 160 from signals provided by the detection system 150 and to drive the valve actuating member 198 in order to continuously monitor/control direction and speed of the valve stem 160 is used to optimize the management of the valve internal movements of parts and/or to optimize the valve cleaning process. This can be achieved by energizing and de-energizing valves to predetermined controlled positions and/or generating small discrete movements around those positions to reach optimal flow conditions of cleaning agents for efficient cleaning.

The ability of the processing unit 145 to determine speed and position of the valve stem 160 from signals provided by the detection system 150 and to drive valve actuating member 198 in order to continuously monitor and/or control direction and speed of the valve stem 160 is used to optimize the management of the valve internal movements of parts to minimize process time. This may be achieved by quickly moving the valve stem 160 to a predetermined position close to the planned end position and then subsequently slowly moving the valve stem 160 to the planned end position.

The ability of the processing unit 145 to extract speed and position of the valve stem 160 from data provided by the detection system 150 and to drive the valve actuating member 198 in order to continuously monitor direction and speed of the valve stem 160 is used to provide more information for the valve and process proactive and/or predictive maintenance. This can be achieved by providing an alarm, stopping the valve or returning the valve back to a predetermined safe position each time a movement (e.g., speed and/or direction) or a position (e.g., open, closed, partially open, etc.) of the valve stem 160 determined as being outside of any predefined or learned tolerances. Additionally, the above mentioned functions may be achieved by monitoring trend shifts on positions or speeds within those defined and/or learned positions and speeds.

The magnetic target 155 placed on the valve stem 160 may be a magnet and the detection system 150 may comprise an array of magneto-resistive components defining a detection zone of a magnet or any other sensing technology providing a similar detection capability. The processing unit 145 includes a microprocessor or any other similar processing unit and the valve actuating member 198 may include solenoids, in the case of a pneumatic valve assembly or any other similar system.

Figure 5:
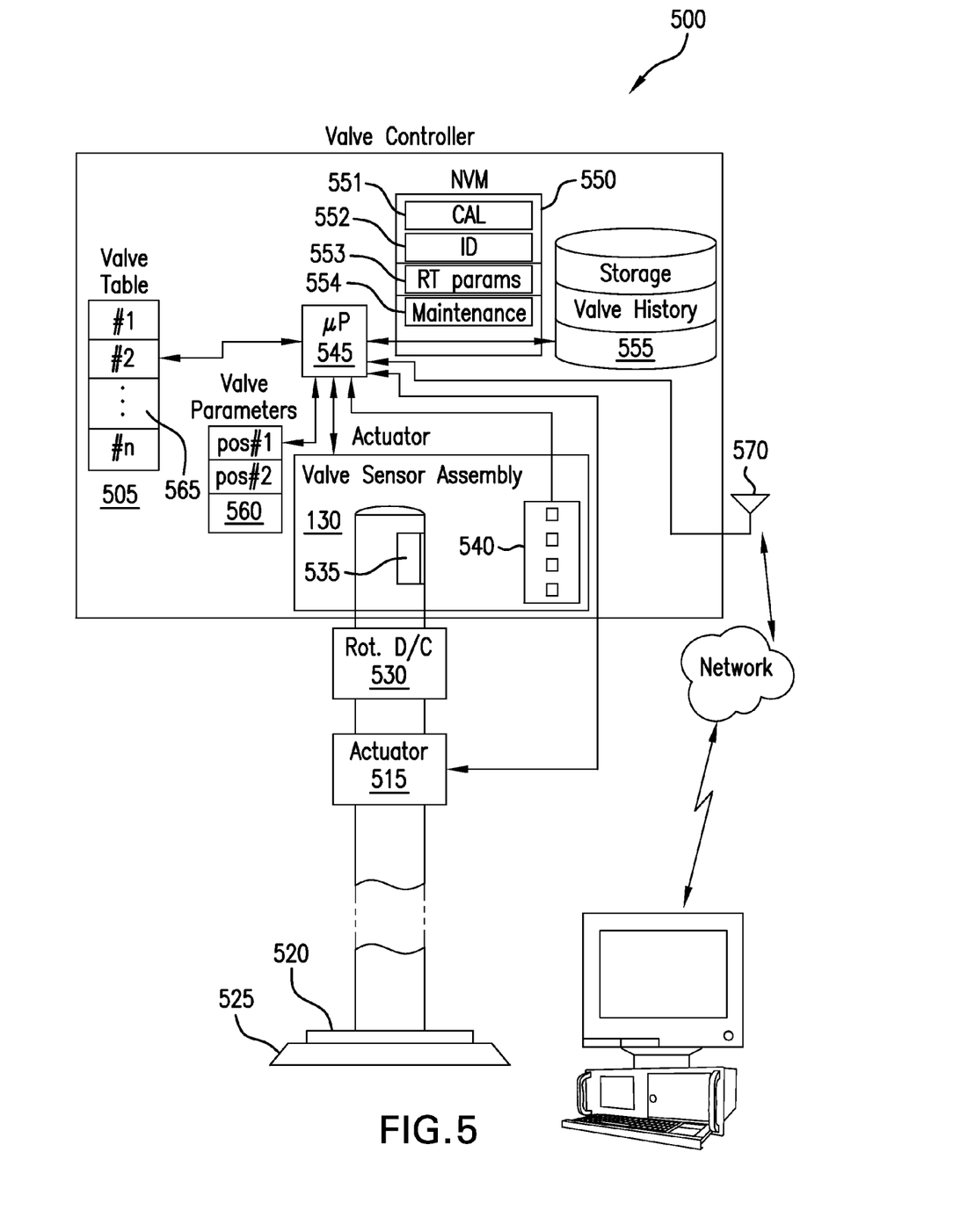
FIG. 5 depicts a block diagram of an exemplary autonomous valve control system.

FIG. 5 depicts a block diagram of an exemplary autonomous valve control system. In the FIG. 5 depiction, a valve control system 500 includes a valve controller 505 coupled to a valve. A valve stem may extend between a valve actuator 515 and a valve disc 520. The valve disc 520 is depicted with a valve gasket 525 for seating on a valve seat. The valve stem has an rotational (or angular) decoupling member 530 for orienting a magnet 535 in magnetic communication with a magnetic-field sensor array 540. The valve controller 505 receives signals from the magnetic-field sensor array 540 indicative of the position of the magnet 535 relative to the magnetic-field sensor array 540. A processor 545 may then calculate the position of the valve stem upon which the magnet 535 is attached. The processor 545 may take periodic measurements of the position of the valve stem and use such position information to determine the speed of displacement of the valve stem. For example, a second position measurement taken a short time after a first position measurement may be subtracted from the first position measurement. The speed of the valve stem may be calculated by dividing this position difference by the time difference between the takings of the two measurements.

The valve controller 505 is shown having a microprocessor 545, non-volatile memory 550, mass storage 555, and various tables. The valve controller 505 may have programs stored in non-volatile memory 550 for performing various operations. For example, stored code when executed may perform valve identification 552, valve calibration 551, valve run-time operation 553, and/or valve condition assessment 554. Various parameter tables 560 may store operating parameters for the valve. For example, upon calibration, the processor may calculate operating parameters for optimally performing run-time operations. Various valve model identification parameters may be stored in a valve identification table 565. The processor 545 may communicate with other network connected devices via an antenna 570 and/or with wired connections, for example.

Figure 6:
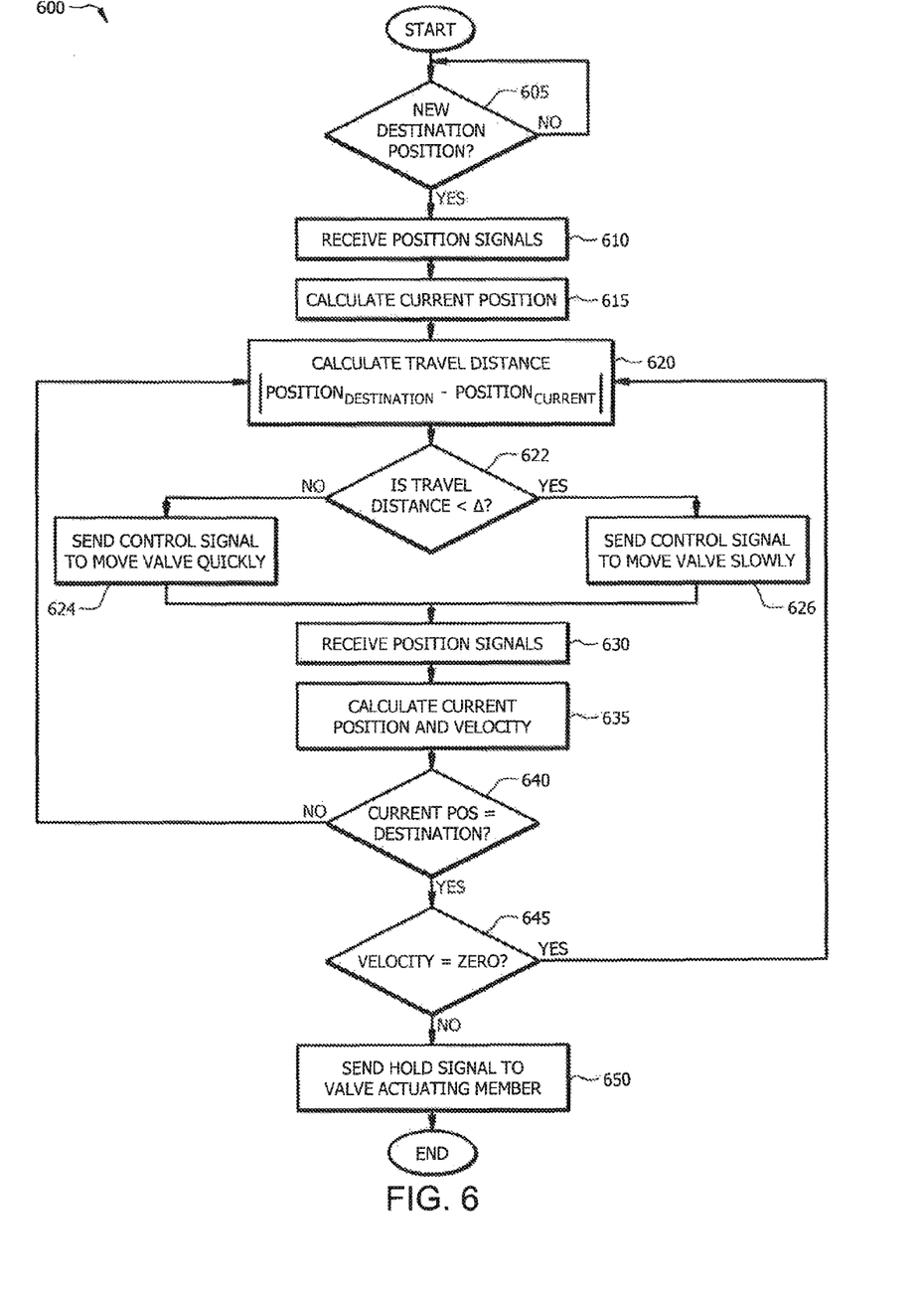
FIG. 6 depicts a flow chart of an exemplary valve control method for minimizing hammering and vibration of a valve stem.

FIG. 6 depicts a flow chart of an exemplary valve control method for minimizing hammering and vibration of a valve stem. In the FIG. 6, an exemplary closed-loop valve control method 600 is detailed from the perspective of the processor 545 of the FIG. 5 block diagram. The method begins with the processor 545 determining if a new valve stem position is needed 605. In some embodiments, valve stem position changes are communicated to the valve via a network. In some embodiments, the valve stem position changes are pre-programmed to operate on a timed schedule, for example. If the processor 545 determines that the valve stem does not need to be moved to a new target displacement, the method returns to step 605 until such a new displacement is needed. If, however, the processor 545 determines that the valve stem does need to be moved to a new target displacement, the processor 545 receives valve stem position signals from the position sensor array 610. Next the processor 545 calculates the valve stem's current displacement position 615, based upon the received position signals.

The processor 545 then uses the calculated valve stem position to calculate the direction and distance needed to move the valve stem to the target position 620. Then the processor compares the needed travel distance with a predetermined distance threshold 622. If the needed travel distance is less than the predetermined threshold, then the processor sends a control signal to the valve actuator member to move the valve slowly 626. If, however, the needed travel distance is not less than the predetermined threshold, then processor sends a control signal to the valve actuator member to move the valve quickly 624. The processor then receives position signals from the sensor array indicative of the valve stems new current position 630. The processor 545 then calculates the current valve stem position based upon the received position signals 635. The processor then determines if the current position is within acceptable limits of the target destination position 640. If the current position is not acceptably close to the target destination position, the method returns to step 620. If, however, the current position is acceptably close to the target destination position, the processor 545 determines if the velocity is acceptably close to zero 645. If the valve stem is still moving more than what is acceptable, the method returns to step 620. If, however, the valve stem is reasonably stopped, then the processor 545 sends a hold signal to maintain the valve stem at the target destination position 650.

Figure 7A:
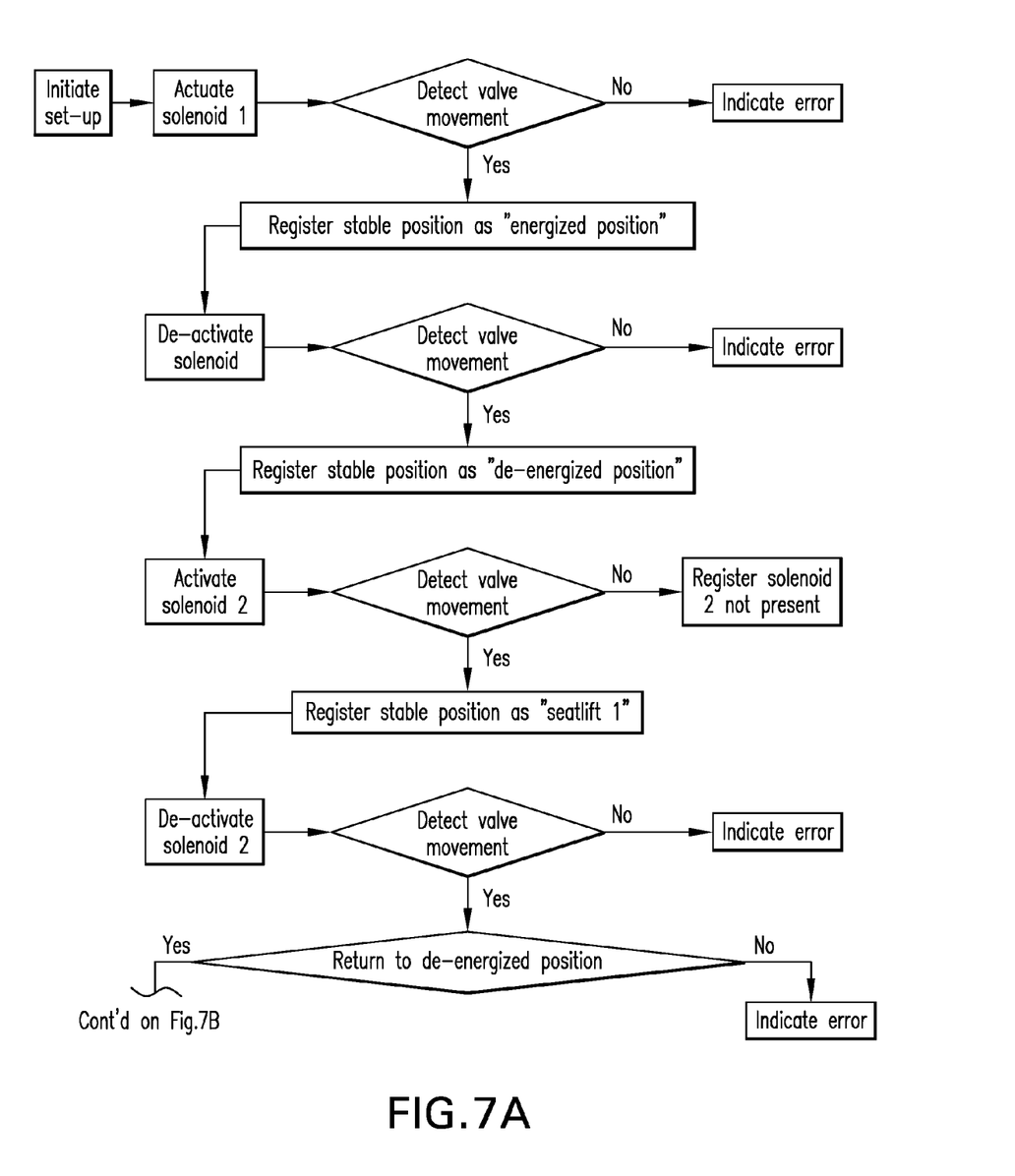
FIGS. 7A-7B depict a flow chart of exemplary steps of an autonomous valve control set-up and configuration method.
Figure 7B:
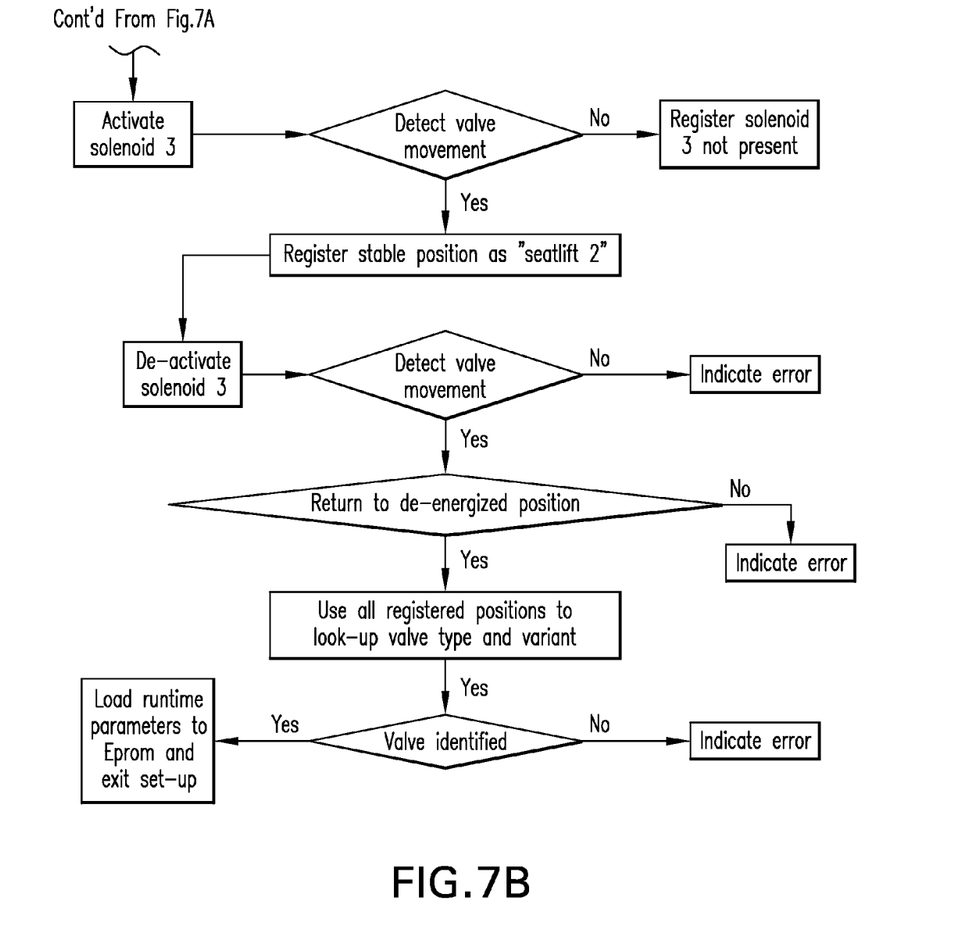

FIGS. 7A-7B depict a flow chart of exemplary steps of an autonomous valve control set-up and configuration method. The flow chart describes the valve teaching function as its ability, from the valve control device, to define the valve model it is assembled on and adapt its parameters accordingly. The device comprising a teaching function actuation means such as a push-button, a switch, a shunt on a connector, etc., a controller such as a microprocessor, ASIC (application specific integrated circuit), or similar device. One or more solenoids, depending upon device model used, at least one magnet, a set of magneto resistive components defining a detection zone of this magnet, a memory comprising a look up table providing a mapping of energized, de-energized, seat-lift position 1 and seat-lift position 2 and any other potential stop position of the valve, for any valve of the portfolio of interest.

The controller, on activation of the teaching function actuation module, may initiate a sequential actuation of the different solenoids, wherever they exist or not and may monitor from the set of magneto-resistive components the position of the magnet attached to the stem of the valve when it reaches any and all stable positions. The controller may compare this set of positions to a look-up table to identify the valve it is assembled on. The controller may adapt its parameters to the valves it is mounted on, based on embedded product knowledge, for example.

This approach addresses the complexity of installing valve control units having several valve variants which can be measured at the valve head. Various embodiments may advantageously substantially reduce or eliminate the need for specialized access or tools and/or added time or product knowledge to configure the valve for the multiple different options. This plug and play (PNP) approach makes use of a self-learning sequence based upon customer knowledge which may advantageously result in a simplified installation process at a substantially reduced cost. In various embodiments, a microprocessor may access a lookup table stored in memory and may use a position sensor to auto-recognize and learn selected valve positions, which may include, by way of example and not limitation, range of motion end-points, and/or one or more user-defined intermediate points between the end-points. In some examples, software methods may also enable leveraging collected data at a local site for future use by combining the sensing capability with a microprocessor and memory.

In the depicted figure, the exemplary method begins with an initiate set-up step, for example, of the microprocessor-based system. In the next step, a device controller may initiate a signal to actuate a first solenoid, which may be coupled, by way of example and not limitation, to a hydraulic or pneumatic line that controls a valve stem to be manipulated. Then, a magnetic-based sensor coupled to the valve to detect a motion profile (e.g., position versus time) of the valve stem, is sampled by the microprocessor to determine valve movement. If expected valve motion profile is not detected in response to the first solenoid actuation step, then an error indication is generated, for example, by the microprocessor. In some embodiments, the error indication may be formatted for display on a display device, or transmitted as an electronic packet message via a network to a monitored control station, for example, in the factory control center.

If expected valve motion profile is detected in response to the first solenoid actuation step, then a status indication is generated, for example, by the microprocessor, to register the valve stable position has reached an "energized position." In some embodiments, the valve stable position indication may be formatted for display on a display device, or transmitted as an electronic packet message via a network to a monitored control station. In the next step, a device controller may initiate a signal to de-activate the first solenoid. Then the magnetic based sensor coupled to the valve is sampled by the microprocessor to determine valve movement. If expected valve motion profile is not detected in response to the first solenoid de-activation step, then an error indication is generated, for example, by the microprocessor.

If expected valve motion profile is detected in response to the first solenoid actuation step, then a status indication is generated, for example, by the microprocessor, to register the valve stable position has reached a "de-energized position." In the next step, a device controller may initiate a signal to activate the second solenoid. Then the magnetic-based sensor coupled to the valve is sampled by the microprocessor to determine valve movement. If expected valve motion profile is not detected in response to the second solenoid activation step, then an indication is generated to register the second solenoid as "not present."

If expected valve motion profile is detected in response to the second solenoid activation step, then an indication is generated to register the valve stable position has reached a "seat-lift position I" position. In the next step, a device controller may initiate a signal to de-activate the second solenoid. Then the magnetic-based sensor coupled to the valve is sampled by the microprocessor to determine valve movement. If expected valve motion profile is not detected in response to the second solenoid activation step, then an error indication is generated, for example, by the microprocessor.

If expected valve motion profile is detected in response to the second solenoid deactivation step, then a status indication is generated to register the valve stable position has returned to a "de-energized position." In the next step, a device controller may initiate a signal to de-energize the second solenoid. Then the magnetic-based sensor coupled to the valve is sampled by the microprocessor to determine valve movement. If expected valve motion profile is not detected in response to the second solenoid activation step, then an error indication is generated.

If expected valve motion profile is detected in response to the second solenoid deenergize step, then the device controller may initiate a signal to activate the third solenoid. Then the magnetic-based sensor coupled to the valve is sampled by the microprocessor to determine valve movement. If expected valve motion profile is not detected in response to the third solenoid activation step, then an indication is generated, to register the third solenoid as "not present."

If expected valve motion profile is detected in response to the third solenoid activation step, then a status indication is generated to register the valve stable position has reached a "seat-lift position 2" position. In the next step, a device controller may initiate a signal to de-activate the third solenoid. Then the magnetic-based sensor coupled to the valve is sampled by the microprocessor to determine valve movement. If expected valve motion profile is not detected in response to the third solenoid activation step, then an error indication is generated, for example, by the microprocessor If expected valve motion profile is detected in response to the third solenoid deactivation step, then an indication is generated to register the valve stable position has returned to a "de-energized position." In the next step, a device controller may initiate a valve identification signal to indicate that a valve signal profile of the present valve matches one or more valve profiles stored in a look-up table in memory accessible by the microprocessor. If expected valve identification is not detected in response to the valve identification signal step, then an error indication is generated.

If expected valve identification is detected in response to the valve identification signal step, then an indication is generated to load parameters of that particular valve model into memory such as the EPROM of the microprocessor and exit the set-up sequence. As part of this set-up sequence, the motion profile for each solenoid can be recorded for further reference.

In some embodiments, use of intelligence-based valve energizing/de-energizing management which provides the ability, from the valve control device, to optimally drive the valve movements for an improved sealing procedure and a reduction or suppression of the hammering effect when a valve stem is reaching the extreme energized and de-energized positions.

In an illustrative example, the controller may use the detection capability of the set of magneto-resistive components to precisely monitor the position of the magnet coupled to (e.g., disposed on, rigidly connected to) the stem of the valve. Wherein the controller, upon receiving an external order (e.g., energize the valve, de-energize the valve, enter a seat-lift position 1 procedure, enter a seat-lift position 2 procedure, or etc.), will manage the command of the solenoids to move first quickly to a position close to the defined position and then move slowly to avoid the hammering effect or vibrating effect experienced with other valve control devices.

The controller may enter a cleaning procedure by making the valve go to an interstitial stage and wherein the controller may pulse the valve around that position to increase the cleaning agent turbulences.

This smart management of the solenoids can be achieved through PWM (pulse width modulation) techniques on the command of the solenoids. The controller may use a closed feedback loop that responds, for example, to time derivatives of position (e.g., velocity, acceleration) of a valve stem motion profile based on current valve position and knowing a position target. PWM frequency and duty cycle management of solenoids may be used to achieve soft energize and de-energize actions. PWM frequency and duty cycle management of solenoids to achieve smart cleaning procedure around an interstitial position. Use of fine resolution position sensing adds control over predetermined fixed positions and such practices may advantageously lead to longer valve life. An intelligence gathering microprocessor having memory combined with a position sensor providing fine resolution, adaptive, and accurate feedback can combine measured pneumatic pressure and valve spring force to produce improved control. Further, the PWM may rely upon a stored motion profile for a given valve having the properties of system pressure, valve movement direction, spring force, and controlled air flow into opposing sides of the valve. The control function may also be adaptive to change over time as the spring force diminishes or fluid viscosity of the fluid that travels through the valve changes, for example.

Use of digital control signals may also provide a linear and smooth valve control for soft open/close and improved cleaning. For example an application may require an existing valve to accommodate additional fine fixed positions such as 70 mm stroke, or the need for opening the valve 2 mm to clean and not need costly multi-position mechanical solutions. In another embodiment, valve health may be monitored with respect to the general tendency for valve performance to degrade with time. Characteristics of the degradation can be difficult to predict as operating parameters have a large influence of the lifespan of the valve (e.g., valve seals, connected equipment). A typical process may involve thousands of valves and a single valve failure can lead to huge cost. Typically, maintenance is too frequent (e.g., before it is required) or too infrequent (e.g., in response to a catastrophic event, line shutdown).

Valve health monitoring may be accomplished in the ability, from the valve control device, to provide useful information for the maintenance of the valve and the full process optimization. The valve device may include: a controller (e.g., microprocessor, ASIC (application specific integrated circuit), microcontroller, digital signal processor, or the like), a magnet, a set of magneto-resistive components defining a detection zone of this magnet, and a memory. In an illustrative example, the controller may monitor and store in memory the time taken by the valve to move from one position to another (e.g., energize to de-energize, de-energize to energize, close to seat-lift position 1, seat-lift position 1 to close, close to seat-lift position 2, seat-lift position 2 to close, and the like) or to accomplish a certain procedure (e.g., cleaning procedure, self-diagnostic check). The controller compares any time taken to move from one position to another or to accomplish a certain procedure to the timings stored in memory and reports a maintenance alert for all timings that are not within stored timings within predetermined tolerance limits, e.g., or within a predetermined tolerance percentage deviation. The controller stores in memory all the known positions from the valve from a monitoring of the measured positions of a magnet placed on the stem of the valve within an array of magneto-resistive components. Time stamp information determined at the time of data collection is associated with the valve performance measurement data. The controller then compares any position that is taken by the valve during its lifetime to the ones stored in memory and reports an alarm indication for all positions that are not within stored positions +/−a tolerance. In various embodiments, valve performance data may include, but is not limited to, scaled representations of motion parameters (position, distance, speed, acceleration, direction, jerk), time parameters, force parameters (thrust, torque), or fluid flow conditions, temperature, aging, maintenance history, model numbers and revision history, or a combination of such factors, for example.

In another embodiment, information pertaining to the valve motion profile could help to detect a failure of the valve to achieve a stored fixed position. For example, mechanical damage of the valve, excess seal wear, pneumatic pressure restriction, mechanical blockage or increased fluid friction may change the valve performance which may be measured using the valve position measurement system. The controller may monitor all positions changing without activation, deactivation of the associated solenoid and report an alarm. For example, an unresponsive or slow responding valve may be caused by media pressure shock, insufficient pneumatic pressure, insufficient spring force.

The controller may monitor positions not changing with activation/deactivation of the associated solenoid and report an alarm. For example, an unresponsive or slow responding valve may be caused by a failure of a solenoid, insufficient pneumatic pressure, insufficient spring force, mechanical blockage or increased fluid friction. The controller may monitor health (e.g., voltage/current) of peripheral equipment (e.g., solenoids, proximity sensors). In one embodiment, after initiating a valve set-up sequence, there may be a stored valve behavior profile such that known valve positions should be achievable within a predetermined period of time for one or more solenoid operations. For example, the microprocessor may monitor the profile performance of a given valve over time and use historic data to calculate a trend of valve behavior. As this behavior degrades over time, a maintenance alarm may be flagged. Additionally, when a stored tolerance, such as <95% stroke length or >50% time to achieve a selected valve position, is breached or a gross deviation of the expected behavior is detected, an alarm can be activated. Furthermore, a close monitoring of peripheral devices enables greater certainty as to the root cause of a given failure. The tolerance on time and position can be automatically adjusted depending on the data recorded at the time of valve set-up in addition to identifying the valve type upon which the control device is mounted. This can be accomplished through implementation of a precision analog position sensor, for example a set of magneto resistive sensors defining a detection zone of a magnet put on the valve stem. Various embodiments may help the end user to carry on the maintenance when it is truly required and to avoid catastrophic events, downtime and loss of production.

The design of the magnet carrier for valve monitoring may be improved such that the sensing target, typically a magnet, is not needed to reside uniformly throughout the rotational motion of the valve stem. This reduces complexity and cost in the design of the magnetic target and sensing device. According to one embodiment, the valve design comprises a stem, a magnet carrier with index, a mechanical means to decouple rotational motion of the stem from magnet carrier during the linear stoke of the valve, at least one magnet, a set of magneto-resistive components defining a detection zone of this magnet, and an index cavity within the sensor housing.

In one embodiment, the magnet carrier is fixed on the valve stem, the magnet carrier index slidably coupled within the index cavity of the sensor housing, independent of stem rotations thanks to the decoupling mechanism resulting from the rotational motion. The magnet size and shape may be optimized to the linear movement that matches a determined motion profile or within the detection field provided by the set of magneto-resistive components. Problems from part to part variations of the magnet may be significantly reduced due to the reduction of complexity (e.g., simplified size and shape of the magnet). Increased uniformity of the magnet reduces sensor design complexity. The decoupling mechanism removes unwanted rotational movement of the magnet.

In another embodiment, speed and position of a valve control device may be continuously monitored and valve position optimized. In many valve applications, valve control is limited to a certain number of fixed positions (e.g., energize, de-energize, seat-lift position). The valve position can be set and remain so during the process with no monitoring of the motion of the stem during transient phases. This type of control has an impact on valve lifespan, cost of ownership of the valve and efficiency of the different processes for which the valve is used to serve.

An improved valve control comprises a valve stem, a detection system that may or may not include one or more targets placed on the stem, a processing unit, and a valve stem activation system. Wherein the detection system is able to continuously sense the displacement of the stem within a linear detection field along the stem movements and wherein the processing unit is able to continuously extract speed and position of the stem from data provided by the detection system.

The processing unit is able to drive a valve stem activation system in order to continuously monitor direction and speed of the stem. This capability includes the ability of the processing unit to extract speed and position of the stem from data provided by the detection system and to drive the valve stem activation system in order to continuously monitor direction and speed of the stem which may be used to optimize the management of the valve internal part movements in order to optimize valve lifespan or reduce maintenance. Improvement examples include, but are not necessarily limited to, reducing or stopping the hammering effect, reducing the level of vibrations generated, and reducing the aging effect on all seals. This may be achieved by operation of valve control and monitoring to obtain smoothly fixed positions.

The ability of the processing unit to extract speed and position of the stem from data provided by the detection system and to drive valve stem activation system in order to continuously monitor direction and speed of the stem is used to optimize the management of the valve internal movements of parts to optimize the valve cleaning process. This can be achieved by energizing and closing valves to predetermined controlled positions and/or generating small discrete movements around those positions to reach optimal flow conditions of cleaning agents for efficient cleaning.

The ability of the processing unit to extract speed and position of the stem from data provided by the detection system and to drive valve stem activation means in order to continuously monitor direction and speed of the stem is used to optimize the management of the valve internal movements of parts to minimize process time. This can be achieved by quickly moving the valve stem to a predetermined position close to the planned end position and then subsequently slowly moving the stem to the planned end position.

The ability of the processing unit to extract speed and position of the stem from data provided by the detection system and to drive valve stem activation means in order to continuously monitor direction and speed of the stem is used to provide more information for the valve and process proactive and/or predictive maintenance. This can be achieved by providing an alarm, stopping the valve or returning the valve back to a predetermined safe position each time a movement (e.g., speed and/or direction) or a position (e.g., open, closed, partially open, etc.) of the valve stem determined as being outside of any predefined or learned tolerances. Additionally, the above mentioned functions may be achieved by monitoring trend shifts on positions or speeds within those defined and/or learned positions and speeds.

The target placed on the stem may be a magnet and the detection system may comprise an array of magneto-resistive components defining a detection zone of a magnet or any other sensing technology providing a similar detection capability. The processing unit can be a microprocessor or any other similar processing unit and the valve stem activation system may be solenoids, in the case of a pneumatic valve assembly or any other similar system.

In an illustrative embodiment, the valve controller may control a second time derivative of the position of a valve stem. The valve controller may use pulse width modulation, for example, to control the actuation profile of a valve actuator, which may affect the valve position profile. Various methods of valve control may be used to energize a valve actuator and de-energize the valve actuator for reducing a water hammering effect in the system. By way of example, and not limitation, amplitude modulation, pulse density modulation, pulse frequency modulation, and/or pulse modulation may be used to control a profile of the valve position. Some valves may have target valve positions at the extremes of a valve position range. For example, some valve positions may have hard physical endpoint to the travel. Some exemplary valves may have target valve positions between the hard physical endpoints. Exemplary valve controllers may use various position/time profiles to move a valve from one position to another. In some examples, a position/time profile may be different for a hard physical end position than for an intermediate position.

In some embodiments, a predetermined cleaning position may be predetermined between a closed position and a fully-open position of the valve stem. For example, a cleaning position may be calculated such that a valve may be opened less than 20% of a fully open position corresponding to the fully-open valve-stem position. In some embodiments, the cleaning position may be calculated to restrict the valve's opening to less than 1%, 2%, 4%, 5%, 8%, 10%, 20% or any value that may cause turbulent flow.

In various implementations, a valve system, such as the valve 130 of FIG. 4, may advantageously reduce the time and labor required to set up a valved control system. In conventional implementations, such setup operations may typically be performed in the field where the valves have been installed. Working in such places may present occupational difficulties for workers, as the space may be cramped or otherwise difficult to access.

For example, various embodiments may advantageously automate the identification of valve type (e.g., manufacturer, model number, etc. . . . ), which may yield substantial savings in environments in which a variety of valve types have been deployed. Upon automated identification of valve type, a master control system, such as the computer 185 of FIG. 1, may store the identification information in association with the location of the valve in the overall system. Further, some embodiments may access such stored information to perform valve maintenance, diagnostic checks, and/or program parameter settings, for example, to improve the control dynamics for each valve's actuator. In certain examples, the valve motion profile trajectory may be more accurately controlled because the parameters of the valve are determined. Moreover, drift in the valve parameters (e.g., due to aging or wear) may be automatically monitored and the corresponding parameters for the valve may be updated, stored, and/or applied to the actuator control to maintain high performance over the lifetime of the valve. In various autonomously controllable valve systems, the speed and movement of the stem may be continuously monitored and compared to the set position/time profile of the valve to register and report any drift during a lifetime of the valve. For example, the speed and movement of a valve stem may be monitored at a predetermined interval and compared to the set position/time profile to determine any change in valve performance. If valve degradation in one or more parameters beyond a predetermined threshold limit is measured, for example, the valve may self report a need for maintenance, or adjust one or more control parameters.

In an illustrative embodiment, an autonomously controllable valve system, for providing turbulent flow of a cleaning solution during a valve-cleaning operation, may include a valve comprising a valve controller. The valve may include a valve seat and a valve disc configured to provide a sealed closure against the valve seat. Some exemplary valves may include a valve stem coupled to the valve disc, the valve stem may provide a mechanical coupling between a valve-actuating member and the valve disc. The valve-actuating member may be adapted to move the valve stem between a closed position and a maximal-open position. In some embodiments, a magnet may be coupled to the valve stem providing a magnetic field. A plurality of magnetic-field detectors may be arranged adjacent to the valve stem to provide signals indicative of the position of the magnet along the valve-stem path. The valve controller may be disposed proximate the valve. The valve controller may include a processor, a plurality of data-memory locations, and a plurality of program-memory locations. The plurality of program-memory locations may contain instructions that, when executed by the processor, cause the processor to perform operations including receiving, from the plurality of magnetic-field detectors, the signals indicative of a current position of the valve stem along the valve-stem path. Some instructions may cause the processor to calculate a velocity of the valve stem using the received signals indicative of the position of the magnet along the valve-stem path. The processor may receive, from a data-memory location, a cleaning position between the closed position and the maximal-open position. In some embodiments, the processor may determine a position/time profile to move the valve stem to the cleaning position from the current position. The processor may generate a control signal that, when received by the valve-actuating member, causes the valve-actuating member to move the valve stem to the cleaning position according to the determined position/time profile. Some instructions may cause the processor to send the generated control signal to the valve-actuating member.

In an illustrative embodiment, the plurality of program-memory locations may contain instructions that, when executed by the processor during an auto-setup procedure, cause the processor to receive, from a data-memory location, a series of control signals that when received by the valve-actuating member and/or one or more additional valve-actuating members, causes one or more of the valve-actuating member and the one or more additional valve-actuating members to move the valve stem to a series of predetermined valve positions associated with one or more valve model. The processor may send the received series of control signals to one or more of the valve-actuating member and the one or more additional valve-actuating members. Some instructions may cause the processor to store, in the data-memory locations, a series of positions that are detected in response to the sending of the series of control signals. The processor may compare the stored series of positions to each of a plurality of sets of predetermined position series, each set corresponding to a valve model. Based upon the comparison, the processor may select a best-fit valve model. Some exemplary instructions may cause the processor to associate a set of functional parameters with the valve, the functional parameters associated with the best-fit valve model.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions.

An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11a/b/g/n, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. An autonomously-controllable valve system for providing turbulent flow of a cleaning solution during a valve-cleaning operation, the autonomously-controllable valve system comprising:
   a valve comprising:
      a valve seat;
      a valve disc configured to provide a sealed closure against the valve seat;
      a valve stem coupled to the valve disc, the valve stem and a valve stem base rotatably coupled along a longitudinal axis to the valve stem such that the orientation of the valve stem is decoupled from an orientation of the valve stem base, the valve stem base providing a mechanical coupling between a valve-actuating member and the valve disc, wherein the valve-actuating member is adapted to move the valve stem along a valve-stem path between a closed position and a maximal-open position;

a magnet coupled to the valve stem providing a magnetic field; and a plurality of magnetic-field detectors arranged adjacent to the valve stem to provide signals indicative of the position of the valve stem along the valve-stem path; and, a valve controller disposed proximate the valve, the valve controller comprising:

a processor;

a plurality of data-memory locations; and a plurality of program-memory locations, wherein the plurality of program-memory locations contains instructions that, when executed by the processor, cause the processor to perform operations comprising:

(a) receiving, from the plurality of magnetic-field detectors, the signals indicative of a current position of the valve stem along the valve-stem path;

(b) calculating a velocity of the valve stem using the received signals indicative of the position of the valve stem along the valve-stem path;

(c) receiving, from a data-memory location, a cleaning position between the closed position and the maximal-open position, (d) determining a position/time profile to move the valve stem to the cleaning position from the current position;

(e) generating a control signal that, when received by the valve-actuating member, causes the valve-actuating member to move the valve stem to the cleaning position according to the determined position/time profile; and, (f) sending the generated control signal to the valve-actuating member.

2. The autonomously-controllable valve system of claim 1, wherein the cleaning position is a position that results in a valve opening that is less than 20% of a maximal opening corresponding to the maximal-open position.

3. The autonomously-controllable valve system of claim 1, further comprising a valve-stem rotational control system having an index member that slidably engages a guide slot.

4. The autonomously-controllable valve system of claim 1, wherein a rotational position of the magnet relative to the magnetic-field detectors is substantially invariant to each longitudinal position along the valve-stem path between the closed position and the maximal-open position.

5. The autonomously-controllable valve system of claim 1, wherein the plurality of program-memory locations contains instructions that, when executed by the processor during an auto-setup procedure, cause the processor to perform operations further comprising:

(g) receiving, from a data-memory location, a series of control signals that when received by the valve-actuating member and/or one or more additional valve-actuating members, causes one or more of the valve-actuating member and the one or more additional valve-actuating members to move the valve stem to a series of predetermined valve stem positions associated with one or more valve model;

(h) sending the received series of control signals to one or more of the valve-actuating member and the one or more additional valve-actuating members;

(i) storing, in the data-memory locations, a series of positions that are detected in response to the sending of the series of control signals;

(j) comparing the stored series of positions to each of a plurality of sets of predetermined position series, each set corresponding to a valve model; and, (k) based upon the comparison, selecting a best-fit valve model;

(l) associating a set of functional parameters with the valve, the functional parameters associated with the best-fit valve model.

6. The autonomously-controllable valve system of claim 1, wherein the cleaning position is a position that results in a valve opening that is less than 10% of a maximal opening corresponding to the maximal-open position.

7. The autonomously-controllable valve system of claim 1, wherein the cleaning position is a position that results in a valve opening that is less than 5% of a maximal opening corresponding to the maximal-open position.

8. The autonomously-controllable valve system of claim 1, wherein determining a position/time profile to move the valve stem to the cleaning position from the current position comprises receiving, from a data-memory location, a predetermined position/time profile associated with the current position of the valve stem.

9. A valve-stem position-sensor system to generate a signal representative of a displacement of a valve-stem along a predetermined valve-stem displacement profile, the valve-stem position-sensor system comprising:

a valve stem operatively displaceable along a longitudinal axis;

a magnetic-field source attached to the valve stem and contained within only one angle between two planes whose intersection defines the longitudinal axis;

an array of magnetic-field sensors distributed along a longitudinal axis to detect a displacement of the magnetic-field source along the valve-stem displacement profile;

a valve stem base rotatably coupled along the longitudinal axis to the valve stem such that the orientation of the valve stem is decoupled from an orientation of the valve stem base, and, an angular-control member configured to orient the magnetic-field source to maintain magnetic-field communication with at least one of the magnetic-field sensors independent of an orientation of the valve stem as the valve stem is displaced along the displacement profile.

10. The valve-stem position-sensor system of claim 9, wherein the angular-control member comprises an index member that slidably engages a guide slot.

11. The valve-stem position-sensor system of claim 9, wherein a magnetic-field source orientation is substantially invariant to each longitudinal displacement along the displacement profile.

12. The valve-stem position-sensor system of claim 9, further comprising a valve-actuating member coupled to drive the valve stem base along the longitudinal axis.

13. The valve-stem position-sensor system of claim 9, further comprising a valve controller configured to receive signals indicative of the displacement of the magnetic-field source along the displacement profile and to send control signals to the valve-actuating member.

14. The valve-stem position-sensor system of claim 13, wherein the valve controller includes a processor and a plurality of program-memory locations.

15. The valve-stem position-sensor system of claim 13, wherein the valve controller is configured to communicate with a communications network.

16. A valve-stem position-sensor system to generate a signal representative of a displacement of a valve-stem along a predetermined valve-stem displacement profile, the valve-stem position-sensor system comprising:
- a valve stem operatively displaceable along a longitudinal axis;
- a magnetic-field source attached to the valve stem and contained within only one angle between two planes whose intersection defines the longitudinal axis;
- an array of magnetic-field sensors distributed along a longitudinal axis to detect a displacement of the magnetic-field source along the valve-stem displacement profile;
- a valve stem base rotatably coupled along the longitudinal axis to the valve stem such that the orientation of the valve stem is decoupled from an orientation of the valve stem base, and,
- means for orienting the magnetic-field source to maintain magnetic-field communication with at least one of the magnetic-field sensors as the valve stem is displaced along the displacement profile.

17. The valve-stem position-sensor system of claim 16, wherein the means for orienting the magnetic-field source comprises an index member that slidably engages a guide slot.

18. The valve-stem position-sensor system of claim 16, wherein a magnetic-field source orientation is substantially invariant to each longitudinal displacement along the displacement profile.

19. The valve-stem position-sensor system of claim 16, further comprising a valve-actuating member coupled to drive the valve stem base along the longitudinal axis.

20. The valve-stem position-sensor system of claim 16, further comprising a valve controller configured to receive signals indicative of the displacement of the magnetic-field source along the displacement profile and to send control signals to the valve-actuating member.

* * * * *